(12) United States Patent
Pawlikowski

(10) Patent No.: US 6,548,578 B2
(45) Date of Patent: Apr. 15, 2003

(54) VULCANIZABLE ELASTOMER COMPOSITIONS CONTAINING STARCH/ STYRENE BUTADIENE RUBBER COPOLYMER AS A REINFORCING FILLER

(75) Inventor: John F. Pawlikowski, Ravenna, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/789,286

(22) Filed: Feb. 20, 2001

(65) Prior Publication Data

US 2002/0161073 A1 Oct. 31, 2002

(51) Int. Cl.⁷ .................. C08L 51/04; C08L 89/00; C08K 3/04; C08K 3/34; C08K 5/24
(52) U.S. Cl. ................. 524/47; 524/52; 524/262; 524/492; 524/495; 524/504; 524/526
(58) Field of Search ............... 524/47, 52, 262, 524/492, 495, 526, 504

(56) References Cited

U.S. PATENT DOCUMENTS

| | | | |
|---|---|---|---|
| 3,480,572 A | * 11/1969 | Buchanan et al. | |
| 3,673,136 A | * 6/1972 | Buchanan et al. | |
| 5,545,680 A | 8/1996 | Corvasce et al. | 524/47 |
| 5,565,509 A | * 10/1996 | Nguyen et al. | |
| 5,672,639 A | 9/1997 | Corvasce et al. | 524/52 |
| 6,013,720 A | 1/2000 | Bell et al. | 524/543 |
| 6,269,858 B1 | 8/2001 | Sandstrom | |
| 6,273,163 B1 | 8/2001 | Materne et al. | |
| 2001/0025068 A1 | 9/2001 | Sandstrom | |
| 2001/0031803 A1 | 10/2001 | Materne et al. | |

FOREIGN PATENT DOCUMENTS

| | | |
|---|---|---|
| EP | 795581 A1 | 9/1997 |
| EP | 995775 A1 | 4/2000 |

* cited by examiner

Primary Examiner—Tae H. Yoon
(74) Attorney, Agent, or Firm—Meredith E. Palmer; Donald J. Bobak

(57) ABSTRACT

The present invention provides a vulcanizable elastomer composition comprising 100 parts by weight of an elastomer; about 5 to about 80 parts by weight of reinforcing filler, per 100 parts of the elastomer, including a starch/ emulsion styrene butadiene copolymer; about 1 to about 6 parts by weight of a coupling agent, per 100 parts of the elastomer, said coupling agent having a moiety reactive with the hydroxyl groups of the starch/emulsion styrene butadiene copolymer and a second moiety reactive with said elastomer; about 40 to about 115 parts of an additional reinforcing filler, per 100 parts of the elastomer, wherein said filler is selected from the group consisting of carbon black, silica and mixtures thereof; and about 0.2 to about 5 parts of a curing agent, per 100 parts of the elastomer. A process is also provided for the preparation of a vulcanized elastomer composition according to the present invention. The vulcanized elastomeric compound of the present invention has goods physical properties for use as a tread stock for pneumatic tires.

19 Claims, No Drawings

VULCANIZABLE ELASTOMER COMPOSITIONS CONTAINING STARCH/STYRENE BUTADIENE RUBBER COPOLYMER AS A REINFORCING FILLER

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for manufacturing articles such as tires, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lower fuel consumption for vehicles using such tires.

In such contexts, the property of lowered hysteresis of compounded, vulcanizable elastomer compositions is particularly significant. Examples of such compounded elastomer systems are known in the art and are comprised of at least one elastomer (that is, a natural or synthetic polymer exhibiting elastomeric properties, such as a rubber), a reinforcing filler agent, such as finely divided carbon black, thermal black, or mineral fillers such as clay and the like and a vulcanizing system such as sulfur-containing vulcanizing (curing) system.

Precipitated silica has been increasingly used as a reinforcing particulate filler in carbon black-filled elastomer compositions of tires and other mechanical goods. Silica-filled elastomer stocks, however, exhibit relatively poor processability.

The use of starch polymers in various industries has been known for many years. Starch polymers have been found to be particularly useful in the food industry and many non-food industries, such as mining, adhesive, paper-making and chemical production industries.

Starch is a carbohydrate polymer having the following repeating unit:

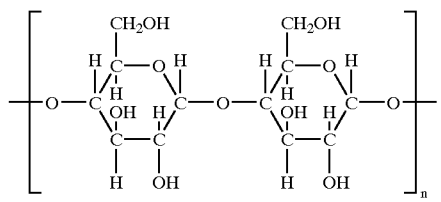

The starch polymer is comprised of two distinct types of D-glucopyranose polymers, namely about 25 percent amylose, which is an essentially linear polymer of "-D-glucopyranosyl units linked by 1→4 glucosidic bonds, and about 75 percent amylopectin., which is a branched polymer comprising "-D-glucopyranosyl units linked by 1→4 glucosidic bonds and 1→6 branch points. For a general discussion of starch polymers see Kirk-Othmer Concise Encyclopedia of Chemical Technology, Fourth Edition, John Wiley & Sons, Inc., Jacqueline I. Kroschwitz, Editor, pp.1882–1884 (1999).

The use of starch has been suggested as a reinforcing filler for various elastomer compositions, as a replacement for silica fillers. Elastomer compositions are conventionally compounded at a temperature range of about 140° C. to about 170° C., and the ultimate physical properties of a cured elastomer composition depend on the degree to which the elastomer additives are effectively or homogeneously dispersed within the elastomer matrix. Typically, the physical properties of a cured elastomer composition are improved as conventional elastomer additives become more homogeneously blended in the elastomer matrix. However, the softening temperature of the starch polymer is above 200° C., and cannot soften or melt and be efficiently blended or dispersed in the elastomer matrix at conventional elastomer compounding temperatures. For this reason, the use of starch polymers as a reinforcing filler for elastomer compositions has been limited.

To overcome the limitations of the high softening point of the starch polymer, the prior art discloses a starch/plasticizer composite for reinforcing rubber compositions. The disclosed starch/plasticizer composite employs plasticizers, such as poly(ethylene vinyl alcohol) and/or cellulose acetate or any suitable plasticizer that results in a starch/plasticizer composite having a melting point below that of the starch alone, and that enables the starch to be more processable with conventional rubber or elastomer composition processing equipment. In order for the starch to be effectively dispersed in the elastomer matrix, the starch must first be blended with the poly(ethylene vinyl alcohol) and/or cellulose acetate to lower the softening point of the starch to between 110° C. and 160° C. to provide for the homogenous dispersion of the starch in the elastomer matrix.

There still remains a need in the art of elastomer compounding to develop cost-effective, renewable filler materials useful as a partial or total replacement for conventional filler materials, such as carbon black and silica, in elastomer compositions, and to improve the processability and physical properties of reinforced elastomer compositions.

The present invention is directed to a reinforced elastomer or rubber composition and to pneumatic tires having tread stocks produced with the reinforced elastomer composition. The invention is more particularly directed to a vulcanizable elastomer composition containing a starch/emulsion styrene butadiene copolymer reinforcing filler as a partial replacement for silica filler.

BRIEF SUMMARY OF THE INVENTION

The present invention, provides a vulcanizable elastomer composition comprising 100 parts by weight of an elastomer; about 5 to about 80 parts by weight of reinforcing filler including a starch/emulsion styrene butadiene copolymer, per 100 parts of the elastomer; about 1 to about 6 parts by weight of a coupling agent, per 100 parts of the elastomer, said coupling agent having a moiety reactive with the hydroxyl groups of the starch/emulsion styrene butadiene copolymer and a second moiety reactive with said elastomer; about 40 to about 115 parts of an additional reinforcing filler, per 100 parts of the elastomer, wherein said filler is selected from the group consisting of carbon black, silica and mixtures thereof; and about 0.2 to about 5 parts of a curing agent, per 100 parts of the elastomer.

The present invention further provides a process for the preparation of a vulcanized elastomer composition comprising reacting 100 parts of an elastomer with about 10 to about 80 parts by weight of reinforcing filler, per 100 parts of the elastomer, the filler including a starch/emulsion styrene butadiene copolymer; about 1 to about 6 parts by weight of a coupling agent, per 100 parts of the elastomer, the coupling agent having a moiety reactive with the hydroxyl groups of the starch/emulsion styrene-butadiene copolymer and a second moiety reactive with the elastomer; about 40 to about 115 parts of an additional reinforcing filler, per 100 parts of the elastomer, wherein the additional filler is selected from the group consisting of carbon black, silica and mixtures thereof; and about 0.2 to about 5 parts of a curing agent, per 100 parts of the elastomer; and effecting vulcanization.

The present invention also provides a pneumatic tire having tread stock vulcanized from an elastomeric composition comprising 100 parts by weight of an elastomer; about 5 to about 80 parts by weight of reinforcing filler, per 100 parts of said elastomer, said filler including a starch/emulsion styrene butadiene copolymer; about 1 to about 6 parts by weight of an alkylalkoxysilane coupling agent, per 100 parts of said elastomer, said coupling agent having a moiety reactive with the hydroxyl groups of the starch/emulsion styrene butadiene copolymer and a second moiety reactive with said elastomer; about 40 to about 115 parts of an additional reinforcing filler, per 100 parts of said elastomer, wherein said additional filler is selected from the group consisting of carbon black, silica and mixtures thereof; and about 0.2 to about 5 parts of a curing agent, per 100 parts of said elastomer.

By employing a starch/emulsion styrene-butadiene copolymer as the reinforcing filler for vulcanizable elastomers, at least part of the conventional filler materials, carbon black and silica can be omitted. The novel use of these copolymer reinforcing fillers results in a more efficient dispersion thereof in the vulcanizable elastomers tan conventional fillers and the use of starch/plasticizer fillers and to provide tire treads for pneumatic tires having improved performance characteristics.

DETAILED DESCRIPTION OF THE INVENTION

The terms "elastomer" and "rubber" as used throughout the specification, may be used interchangeably. The terms "elastomer composition", "rubber composition", "elastomer formulation", "elastomer compound" and "rubber compound", may be used interchangeably, and refer to rubber that has been blended or mixed with various conventional rubber additives that are well known to those having ordinary skill in the rubber mixing or rubber compounding art.

The term "phr", as used throughout the specification, and according to conventional rubber compounding practice, refers to parts of a respective component per 100 parts by weight of rubber or elastomer.

The terms "curing agent" and vulcanizing agent", as used throughout the specification, may be used interchangeably, and refer to those materials that are traditionally known by those having ordinary skill in the art of rubber compounding to effect vulcanization of the elastomer or rubber composition.

As mentioned hereinabove, a reinforced vulcanizable elastomer composition has been developed, the composition comprising 100 parts by weight of an elastomer; about 5 to about 80 phr of reinforcing filler, including a starch/emulsion styrene butadiene copolymer; about 1 to about 6 phr of a coupling agent, the coupling agent having a moiety reactive with the hydroxyl groups of the starch/emulsion styrene butadiene copolymer and a second moiety reactive with the elastomer; about 40 to about 115 phr of an additional reinforcing filler, wherein the additional filler is selected from the group consisting of carbon black, silica and mixtures thereof; and about 0.2 to about 5 phr of a curing agent.

The elastomeric polymers are utilized as 100 parts of the rubber in the treadstock compound and comprise natural rubber, synthetic rubber and blends thereof. Synthetic rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. It is to be appreciated that the relative amounts of various elastomers in blends will depend primarily upon the degree of reduced hysteresis that is desired.

The starch/emulsion styrene butadiene (starch/E-SBR) copolymer is included in the present invention as a partial replacement for conventional precipitated silica filler material. The starch/E-SBR copolymer is included in an amount ranging from about 5 to about 80 phr. The weight ratio of the starch to the styrene butadiene rubber in the starch/E-SBR copolymer is in the range of about 5 to about 70 parts by weight of starch to about 30 to about 95 parts by weight of E-SBR copolymer, more preferably from about 40 to about 70 parts by weight of starch to about 30 to about 60 parts by weight of E-SBR copolymer and most preferably about 50 to about 50 parts by weight of each.

The starch polymer is comprised of two distinct types of D-glucopyranose polymers, namely about 25 percent amylose, which is an essentially linear polymer of "-D-glucopyranosyl units linked by 1→4 glucosidic bonds, and about 75 percent amylopectin., which is a branched polymer comprising "-D-glucopyranosyl units linked by 1→4 glucosidic bonds and 1→6 branch points. The ratio of amylose to amylopectin units in the starch polymer comprising the starch/E-SBR copolymer is preferably in the range of about 5 to about 100 units, more preferably about 20 to about 80 units and most preferably about of 25 to about 75 units.

The starch may be obtained commercially from plants, such as corn, potatoes, rice and wheat. The copolymer product can be either a high solids liquid or a powdered granule.

A useful starch/E-SBR copolymer for practice of the present invention and which is exemplified herein is Penweave SD-50S, manufactured by Penweave Products Co. It is a proprietary material, having a slight odor and provided as a white to tan powder, 94 to 97 percent solids. It emulsifies in water and is classified as non-hazardous and has CAS No. 127358-79-6. Information from its MSDS sheet reveals that the dried polymer is combustible; it poses a dust explosion hazard; it can be extinguished with water; it decomposes in carbon dioxide, water and typical combustion products and, it is incompatible with strong oxidizers.

The elastomer compositions of the present invention further comprise carbon black as an additional filler material. The polymers can be compounded with all forms of carbon black in amounts ranging from about 2 to about 50 phr, with about 5 to about 40 phr being preferred. The carbon blacks may include any of the commonly available, commercially-produced carbon blacks but those having a surface area (EMSA) of at least 20 $m^2$/gram and more preferably at least 35 m²/gram up to 200 m²/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in Table I hereinbelow.

TABLE I

CARBON BLACKS

| ASTM Designation | Surface Area (m²/gram) |
| --- | --- |
| N-110 | 126 |
| N-220 | 11 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

According to the present invention, amorphous silica (silicon dioxide) is utilized as an additional filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas useful in for the present invention, the surface area should be about 32 to about 400 m²/g, with the range of about 100 to about 250 m²/g being preferred, and the range of about 150 to about 220 m²/g being most preferred. The pH of the silica filler is generally about 5.5 to about 7 or slightly over, preferably about 5.5 to about 6.8.

Silica can be employed in the amount of about 1 part to about 100 parts by weight per 100 phr, preferably in an amount from about 5 to about 80 phr. The useful upper range is limited by the high viscosity imparted by fillers of this type. Some of the commercially available silicas which may be used include those commercially available from PPG Industries under the trade designations Hi-Sil7 215, Hi-Sil7 233, and Hi-Sil7 190. Also, a number of commercial grades of different silicas are available from De Gussa Corporation, Rhone Poulenc, and J.M. Huber Corporation are useful in the elastomer composition of the present invention.

The vulcanizable elastomeric compounds of the present invention can be optionally compounded with all forms of carbon black in amounts ranging from 0 to about 50 parts by weight phr, with about 5 to about 40 phr being preferred. When carbon black is present with silica, the amount of silica can be decreased to as low as about one phr, otherwise it too is present alone in at least 5 phr. As is known to those skilled in the art, elastomeric compounds as are discussed herein are typically filled to a volume fraction of about 25 percent which is the total volume of filler(s) added divided by the total volume of the elastomeric stock. Accordingly, while the minimum amounts expressed herein are operable, a useful range of reinforcing fillers i.e., silica and carbon black, is about 70 to 90 phr.

The use of coupling agents to couple silica filler to the elastomer matrix is well known to those having ordinary skill in the art of elastomer compounding. The coupling agents possess two distinct moieties. The first moiety is capable of reacting with the hydroxyl groups of the surface of the reinforcing silica filler and the second moiety interacts with the vulcanizable elastomer. Accordingly, the coupling agent acts as a connector between the reinforcing silica filler and the elastomer matrix.

Therefore, the elastomer formulation of the present invention includes coupling agents that can couple the starch to the elastomer. Useful coupling agents for practice of this invention are the organosilanes, with the alkylalkoxysilanes being preferred. Suitable alkylalkoxysilanes useful in the present invention include alkylalkoxysilanes of the formula $(R1)2Si(OR2)_2$ or $R1Si(OR2)_3$, wherein the alkoxy groups are the same or are different; each R1 independently comprising C1 to about C18 aliphatic, about C6 to about C12 cyclo-aliphatic, or about C6 to about C18 aromatic, preferably C1 to about C10 aliphatic, about C6 to about C10 cyclo-aliphatic, or about C6 to about C12 aromatic; and each R2 comprising C1 to about C8 aliphatic. Representative examples include octyltriethoxy silane, octyltrimethyloxy silane, (3-glycidoxypropyl)trimethoxy silane, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyldimethyoxy silane, 3-chloropropyltriethoxy silane, methacrylotrimethoxy silane, i-butyltriethoxy silane, and the like. The most preferred alkylalkoxysilane coupling agent of the present invention is bis-triethoxy silyl propyl testrasulfide. The alkylalkoxysilane coupling agent may be supported on a carbon black or silica carrier. Such a coupling agent is available under the tradename X50S, from DeGussa Corporation, and is utilized in the formulations appearing in Table II hereinbelow.

Vulcanizable elastomeric compositions of the invention can be prepared by compounding or mixing the elastomeric or rubber polymer with the starch/emulsion styrene butadiene copolymer according to the present invention, a coupling agent, additional filler materials, such as carbon black, silica and mixtures thereof, and other conventional rubber additives including for example, plasticizers, antioxidants, and the like, using standard rubber mixing equipment and procedures.

The elastomer compositions of the present invention further comprise curing agents and at least one organic accelerator in order to effect full crosslinking or curing of the elastomer composition. For example, sulfur or peroxide-based curing systems may be employed. The composition is typically vulcanized for a period of time at an elevated temperature to ensure crosslinking. The polymeric composition may be cured using any of several well-known curing agents, but preferably the curing agent of the present invention includes sulfur and one or more sulfur vulcanizing accelerators. Generally, the sulfur curing agent employed in the elastomer composition of the present invention is provided in amounts ranging from about 0.5 to about 5 phr.

As noted, the sulfur and sulfur-containing cure systems used in the present invention typically include one or more sulfur vulcanizing accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; other thiazole accelerators such as Captax (MBT) or Altax (MBTS), 2-mercaptoimidazoline, N,N-diphenylguanadine, N,N-di-(2-methylphenyl)-guanadine, 2-mercaptobenzothiazole, 2-(morpholinodithio) benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate, zinc dimethyldithiocarbamate and zinc dibutyldithiocarbamate (ZDBDC). The cure accelerators employed in the elastomer composition of the present invention is provided in amounts ranging from about 0.1 to about 3 phr, depending upon the amount of sulfur utilized.

It should be appreciated that the foregoing list is not exclusive, and that other vulcanizing agents known in the art to be effective in the curing of elastomer compositions employed in the polymer blend may also be utilized. For a general disclosure of suitable vulcanizing agents one can refer to Kirk-Othmer Concise Encyclopedia of Chemical Technology, Fourth Edition, John Wiley & Sons, Inc., Jacqueline I. Kroschwitz, Editor, p.1770 (1999), particularly "Vulcanization Agents." Vulcanizing agents can be used alone or in combination. For a list of additional vulcanizing agents, see The Vanderbilt Rubber Handbook, RT Vanderbilt Co., Norwalk Conn. 06855 (1990). It should also be understood that these sulfur donor-type accelerators may be used in place of the elemental sulfur or in conjunction therewith.

The cure accelerators generally require a metal oxide for cure activation. Zinc oxide is almost always the preferred metal oxide for cure activation, because of its effectiveness as a cure activator and its lack of toxicity. The amount of zinc oxide in the vulcanizable elastomeric composition of the present invention is from about 1 to about 10 phr, more preferably about 4 phr. The vulcanizable elastomeric composition of the present invention further includes from about 1 to about 6 phr to initiate the vulcanization process.

Both zinc oxide and stearic acid act as cure activators in the presence of a sulfur cure agent, one or more cure accelerators and unsaturated elastomer to promote the formation of the sulfur crosslinks during the vulcanization process. Some of the initial chemical reactions which take place during the early stages of the vulcanization process include reacting zinc oxide with stearic acid to form salts of even greater vulcanization activity.

Processing materials, such as process oils may be included in the elastomer composition of the present invention to improve the processability of the composition. Suitable process oils include paraffinic, naphthenic and aromatic oils. The process oil may be present in an amount ranging from 0 to about 50 phr, more preferably in an amount ranging from 5 to about 25 phr.

Reinforcing resin materials may also be included in the vulcanizable elastomer composition of the present invention. The reinforcing resins are present in the vulcanizable elastomer compositions of the present invention in an amount ranging from 1 to about 10 phr, more preferably in a range from about 2 to about 6 phr. Suitable reinforcing resins useful in the present invention include, but are not limited to phenolic resins, phenolformaldehyde types, rosins, coumaroneindene types, and aromatic hydrocarbons. The most preferred reinforcing resins are phenolic resins.

The present invention further provides a process for the production of a vulcanized elastomer composition comprising reacting 100 parts of an elastomer with about 5 to about 80 phr of reinforcing filler including a starch/emulsion styrene-butadiene copolymer; about 1 to about 6 phr of a coupling agent, said coupling agent having a moiety reactive with the hydroxyl groups of the starch/emulsion styrene butadiene copolymer and a second moiety reactive with said elastomer; about 40 to about 115 phr of an additional reinforcing filler, wherein said additional filler is selected from the group consisting of carbon black, silica and mixtures thereof; and about 0.2 to about 5 phr of a curing agent; and effecting vulcanization.

The mixing or compounding of the elastomer composition of the present invention may be accomplished by standard rubber compounding methods known to those having ordinary skill in the rubber compounding art.

General Experimentation

In order to demonstrate the properties of elastomer stocks containing a starch/emulsion styrene butadiene copolymer prepared according to the present invention, elastomer compositions were prepared.

A stock predominantly based on styrene-butadiene rubber, blended with 20 parts by weight of natural rubber, and reinforced with silica was compounded as a Control, Example No.1. Comparative Examples, No. 2 and 3 were compounded without any silica but each containing 30 phr of starch copolymer, according to the present invention. Formulations of the three compounds are presented in Table II, followed by physical properties, presented in Table III.

TABLE II

Elastomer Formulations for Replacement of Silica Filler with Starch/E-SBR Copolymer

| EXAMPLE NO. | CONTROL 1 Plant | 2 | 3 |
|---|---|---|---|
| SBR | 90.59 | 69.26 | 69.26 |
| NR | 20 | 20 | 20 |
| Carbon Black | 42 | 42 | 42 |
| Silica | 14.5 | 0 | 0 |
| Stearic Acid | 2 | 2 | 2 |
| Wax | 1 | 1 | 1 |
| Oil | 19 | 24.5 | 19 |
| Starch Copolymer | 0 | 30 | 30 |
| X50S[a)] | 2.9 | 2.9 | 2.9 |
| Sulfur | 2 | 2 | 2 |
| ZnO | 2 | 2 | 2 |
| CBS[b)] | 1.4 | 1.4 | 1.4 |
| Total Parts | 197.39 | 197.06 | 191.56 |

TABLE II-continued

Elastomer Formulations for Replacement of Silica Filler with Starch/E-SBR Copolymer

| EXAMPLE NO. | CONTROL 1 Plant | 2 | 3 |
|---|---|---|---| a) coupling agent
b) curative (N-cyclohexyl-2-benzothiazole sulfenamide)

TABLE III

Physical Properties for Elastomer Formulations of Table II

|  |  | Ex. No. 1 | Ex. No. 2 | Ex. No. 3 |
|---|---|---|---|---|
| Low Ext Modulus (Mpa) | | | | |
| 1% | | 0.087 | 0.088 | 0.088 |
| 2% | | 0.13 | 0.146 | 0.163 |
| 5% | | 0.223 | 0.268 | 0.304 |
| 10% | | 0.34 | 0.409 | 0.469 |
| 25% | | 0.561 | 0.688 | 0.789 |
| Ring Modulus (MPa RT) Normal | | | | |
| M100 | | 1.4 | 1.9 | 2.2 |
| M200 | | 3.4 | 4.6 | 5.4 |
| M300 | | 7.1 | 7.8 | 9.5 |
| TB | | 23.5 | 15.7 | 17.3 |
| EB, % | | 606 | 549 | 498 |
| Ring Modulus (MPa RT) Aged 2 Days @ 100° C. | | | | |
| M100 | | 2.1 | 3.1 | 3.6 |
| M200 | | 5.4 | 7.6 | 8.8 |
| M300 | | 11.1 | 12.7 | 14.8 |
| TB | | 22.9 | 17.6 | 18.5 |
| EB, % | | 486 | 415 | 373 |
| Ring Modulus (MPa 100° C.) Norm. | | | | |
| M100 | | 1.2 | 1.3 | 1.5 |
| M200 | | 2.8 | 3 | 3.4 |
| M300 | | 5.5 | 4.9 | 5.8 |
| TB | | 10.5 | 6.9 | 8.4 |
| EB, % | | 440 | 408 | 406 |
| Elong*Tensile | | 4620 | 2815.2 | 3410.4 |
| Ring Modulus (MPa -21° C.) Norm. | | | | |
| M100 | | 2.4 | 5.1 | 5.1 |
| M200 | | 5.8 | 11.4 | 11.2 |
| M300 | | 11.7 | 16.4 | 17.3 |
| TB | | 28.8 | 18.4 | 22.1 |
| EB, % | | 525 | 359 | 373 |
| Durometer | 0° C. | 60.5 | 65.7 | 68.2 |
| Shore A | RT | 58.7 | 62.2 | 64.1 |
| (Rebound | 66° C. | 55.7 | 57.3 | 60.9 |
| block) | 100° C. | 54.5 | 56.5 | 59.3 |
|  | 0° C. | 31.5 | 27.7 | 27.2 |
| % Rebound | | | | |
| Zwick | RT | 48.8 | 44.2 | 43.4 |
| Pendulum | 66° C. | 61.7 | 59.9 | 60 |
|  | 100° C. | 65.8 | 63.4 | 63.8 |
| ML/4/ 130° C. | MVU's | 48.6 | 48 | 60.2 |
| MS/130° C. | minutes | 20.63 | 13.67 | 11.67 |
| MTS 0° C. | K' (lb/in) | 1590 | 2204 | 2453 |
|  | K" (lb/in) | 465 | 715 | 807 |
| 50 lb preload | K* (lb/in) | 1656 | 2317 | 2583 |
| 2% deflection | $10^{-4}$ in/lb | 1.696 | 1.332 | 1.211 |
| 10 Hz | tan delta | 0.293 | 0.325 | 0.329 |
| MTS RT | K' (lb/in) | 873 | 1142 | 1245 |
|  | K" (lb/in) | 177 | 249 | 281 |
| 10 lb preload | K* (lb/in) | 891 | 1169 | 1276 |
| 5% deflection | $10^{-4}$ in/lb | 2.226 | 1.825 | 1.724 |
| 10 Hz | tan delta | 0.202 | 0.218 | 0.226 |
| MTS 50° C. | K' (lb/in) | 642 | 815 | 866 |
|  | K" (lb/in) | 108 | 144 | 148 |
| 10 lb preload | K* (lb/in) | 651 | 827 | 879 |
| 5% deflection | $10^{-4}$ in/lb | 2.547 | 2.105 | 1.921 |
| 10 Hz | tan delta | 0.168 | 0.177 | 0.171 |
| MTS 65° C. | K' (lb/in) | 631 | 786 | 829 |
|  | K" (lb/in) | 99 | 131 | 131 |
| 10 lb preload | K* (lb/in) | 638 | 797 | 839 |
| 5% deflection | $10^{-4}$ in/lb | 2.424 | 2.066 | 1.854 |
| 10 Hz | tan delta | 0.157 | 0.167 | 0.158 |
| RDA -25° C. 0.1% strain | G', MPa | 26.61 | 51.91 | 60.76 |
|  | G", MPa | 17.45 | 34.64 | 37.62 |
|  | G*, MPa | 31.82 | 62.41 | 71.47 |
|  | J", 1/MPa | 0.017 | 0.009 | 0.007 |
|  | tan delta | 0.655 | 0.667 | 0.619 |
|  | (actual temp. ° C.) | -26.6 | -26.7 | -26.9 |
| RDA 0° C. 0.1% strain | G', MPa | 4.425 | 6.37 | 7.463 |
|  | G", MPa | 1.504 | 2.398 | 2.785 |
|  | G*, MPa | 4.674 | 6.806 | 7.966 |
|  | J", 1/MPa | 0.069 | 0.052 | 0.044 |
|  | tan delta | 0.340 | 0.377 | 0.373 |
|  | (actual temp. ° C.) | -1.5 | -1.2 | -1.3 |
| RDA 30° C. 5.0% strain | G', MPa | 2.753 | 3.44 | 4.009 |
|  | G", MPa | 0.566 | 0.798 | 0.936 |
|  | G*, MPa | 2.81 | 3.532 | 4.117 |
|  | J", 1/MPa | 0.072 | 0.064 | 0.055 |
|  | tan delta | 0.206 | 0.232 | 0.234 |
|  | (actual temp. ° C.) | 27.9 | 28 | 28.2 |
| RDA 50° C. 5.0% strain | G', MPa | 2.259 | 2.691 | 3.116 |
|  | G", MPa | 0.391 | 0.500 | 0.574 |
|  | G*, MPa | 2.292 | 2.737 | 3.168 |
|  | J", 1/MPa | 0.074 | 0.067 | 0.057 |
|  | tan delta | 0.173 | 0.186 | 0.184 |
|  | (actual temp. ° C.) | 48.8 | 48.8 | 48.8 |
| RDA 60° C. 5.0% strain | G', MPa | 2.127 | 2.508 | 2.895 |
|  | G", MPa | 0.351 | 0.445 | 0.506 |
|  | G*, MPa | 2.155 | 2.547 | 2.939 |
|  | J", 1/MPa | 0.075 | 0.069 | 0.059 |
|  | tan delta | 0.165 | 0.177 | 0.175 |
|  | (actual temp. ° C.) | 58.7 | 58.7 | 58.6 |
| Snow Sensitivity | | 0.5 | 0.56 | 0.54 |
| Ring Tear lb/in | RT | | | |
|  | 100° C. | 305 | 237 | 256 |
|  | 160° C. | 182 | 113 | 167 |
| Predicted Performance Ratings | | | | |
|  | CC a) | 83.4 | 95.2 | 99.7 |
|  | WET | 92.8 | 96.4 | 96.9 |
|  | WET (SILICA) | 96.1 | 99.7 | 100.1 |
|  | DRY | 91 | 93.2 | 94.2 |
|  | SNOW (M100%) | 116.5 | 99.7 | 99.7 |
|  | SNOW (G*-25° C.) | 109 | 104.5 | 103.7 |
|  | RORO b) | 113.4 | 111.8 | 113.2 |
| Volume Resistivity | Ohms | 2.69E+09 | 5.88E+09 | 9.12E+08 | a) cornering coefficient
b) rolling resistance

As can be seen from the data presented in Table III, predicted performance ratings for the compounds of Examples 2 and 3 were higher, indicating improvement, for wet traction. Some trade-off in values for snow performance occurred for these compounds, where test values were slightly lower than for the Control, Example No. 1.

The traditional issue of incorporating starch into the polymer matrix is overcome by the use of this novel starch/emulsion styrene butadiene copolymer. The starch component can be considered a renewable resource and reflects the effort the polymer industry is putting forth to maintain its environmental awareness. As this particular example shows, there were improvements in wet, dry and cornering coefficient properties while maintaining physical properties. The disclosure herein represents the benefit of using a starch/emulsion styrene butadiene copolymer as a viable way of incorporating a starch and retaining the benefits of the starch portion as a whole, to maintain and/or improve tire performance properties over conventional filler systems.

Based on the foregoing disclosure, it is therefore demonstrated that the present invention provides a means for partially replacing silica filler in elastomer compositions with a starch/emulsion styrene butadiene copolymer. It is further demonstrated that the present invention provides vulcanizable elastomeric composition having physical properties comparable to conventional silica-filled compositions. The selection of specific rubber additives, such as cure agents, cure accelerators, additional fillers, process aids, process oils, antioxidants and plasticizers can be determined by one having ordinary skill in the art with out departing form the spirit of the invention herein disclosed and described.

It should be specifically noted that the elastomeric compositions of the present invention should not be limited to those comprising styrene butadiene as the elastomer component, and that any elastomeric matrix which can be compounded with the starch/E-SBR copolymer to produce the required physical properties may be used. It should therefore be appreciated that the present invention is not limited to the specific embodiments described above, but includes variations, modifications and equivalent embodiments defined by the following claims.

What is claimed is:

1. A vulcanizable elastomer composition comprising:
   100 parts by weight of an elastomer;
   about 5 to about 80 parts by weight of reinforcing filler, per 100 parts of said elastomer, said filler including a starch/emulsion styrene butadiene copolymer;
   about 1 to about 6 parts by weight of an alkylalkoxysilane coupling agent, per 100 parts of said elastomer, said coupling agent having a moiety reactive with the hydroxyl groups of the starch/styrene butadiene copolymer and a second moiety reactive with said elastomer;
   about 40 to about 115 parts of an additional reinforcing filler, per 100 parts of said elastomer, wherein said additional filler is selected from the group consisting of carbon black, silica and mixtures thereof; and
   about 0.2 to about 5 parts of a curing agent, per 100 parts of said elastomer.

2. The vulcanizable elastomer of claim 1, wherein said elastomer is selected from the group consisting of synthetic rubber, natural rubber, and blends thereof.

3. The vulcanizable elastomer of claim 1, wherein said weight ratio of the starch to the emulsion styrene butadiene in the starch/emulsion styrene butadiene copolymer is 50:50, based on the total weight of said copolymer.

4. The vulcanizable elastomer of claim 1, wherein said additional reinforcing filler is a mixture of carbon black and silica, wherein the ratio of carbon black to silica in the mixture is from about 0.1 to about 1 to about 10 to about 1.

5. The vulcanizable elastomer of claim 1, wherein said coupling agent is an organosilane.

6. The vulcanizable elastomer of claim 5, wherein said organosilane is an alkylalkoxysilane.

7. The vulcanizable elastomer of claim 6, wherein said alkylalkoxysilane is selected from the group consisting of silanes having the formula $(R1)2Si(OR2)_2$ or $R1Si(OR2)_3$, wherein the alkoxy groups are the same or are different; each R1 is selected from the group consisting of C1 to about C18 aliphatics, about C6 to about C12 cyclo-aliphatics, and about C6 to about C18 aromatics, and each R2 is selected from the group consisting of C1 to about C8 aliphatics.

8. The vulcanizable elastomer of claim 7, wherein said alkylalkoxysilane is selected from the group consisting of octyltriethoxy silane, octyltrimethyloxy silane, bis-triethoxy silyl propyl tetrasulfide, (3-glycidoxypropyl)trimethoxy silane, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyldimethyoxy silane, 3-chloropropyltriethoxy silane, methacryoltrimethoxy silane, and i-butyltriethoxy silane.

9. The vulcanizable elastomer of claim 8, wherein said alkylalkoxysilane is bis-triethoxy silyl propyl tetrasulfide.

10. The vulcanizable elastomer of claim 1, wherein said curing agent is sulfur.

11. A pneumatic tire having tread stock vulcanized from an elastomeric composition comprising:
    100 parts by weight of an elastomer;
    about 5 to about 80 parts by weight of reinforcing filler, per 100 parts of said elastomer, said filler including a starch/emulsion styrene butadiene copolymer;
    about 1 to about 6 parts by weight of an alkylalkoxysilane coupling agent, per 100 parts of said elastomer, said coupling agent having a moiety reactive with the hydroxyl groups of the starch/emulsion styrene butadiene copolymer and a second moiety reactive with said elastomer;
    about 40 to about 115 parts of an additional reinforcing filler, per 100 parts of said elastomer, wherein said additional filler is selected from the group consisting of carbon black, silica and mixtures thereof; and
    about 0.2 to about 5 parts of a curing agent, per 100 parts of said elastomer.

12. The pneumatic tire of claim 11, wherein said elastomer is selected from the group consisting of synthetic rubber, natural rubber, and blends thereof.

13. The pneumatic tire of claim 11, wherein the weight ratio of the starch to the emulsion styrene butadiene in said starch/emulsion styrene butadiene copolymer is 50:50, based on the total weight of said copolymer.

14. The pneumatic tire of claim 11, wherein said additional reinforcing filler is a mixture of carbon black and silica, wherein the ratio of carbon black to silica is from about 0.1 to about 10 to about 10 to about 1.

15. The pneumatic tire of claim 11, wherein said alkylalkoxysilane is selected from the group consisting of silanes having the formula $(R1)2Si(OR2)_2$ or $R1Si(OR2)_3$, wherein the alkoxy groups are the same or are different; each R1 is selected from the group consisting of C1 to about C18 aliphatics, about C6 to about C12 cyclo-aliphatics, and about C6 to about C18 aromatics, and each R2 is selected from the group consisting of C1 to about C8 aliphatics.

16. The pneumatic tire of claim 15, wherein said alkylalkoxysilane is selected from the group consisting of octyltriethoxy silane, octyltrimethyloxy silane, (3-glycidoxypropyl)trimethoxy silane, bis-triethoxy silyl propyl tetrasulfide, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyldimethyoxy silane, 3-chloropropyltriethoxy silane, methacryoltrimethoxy silane, and i-butyltriethoxy silane.

17. The pneumatic tire of claim 16, wherein the alkylalkoxysilane is bis-triethoxy silyl propyl tetrasulfide.

18. The pneumatic tire of claim 11, wherein said cure agent is sulfur.

19. A process for the preparation of a vulcanized elastomer composition comprising:

mixing 100 parts of an elastomer with about 5 to about 80 parts by weight of reinforcing filler, per 100 parts of said elastomer, said filler including a starch/emulsion styrene butadiene copolymer per 100 parts of said elastomer;

about 1 to about 6 parts by weight of a coupling agent, per 100 parts of said elastomer, said coupling agent having a moiety reactive with the hydroxyl groups of the starch/emulsion styrene butadiene copolymer and a second moiety reactive with said elastomer;

about 40 to about 115 parts of an additional reinforcing filler per 100 parts of said elastomer, wherein said filler is selected from the group consisting of carbon black, silica and mixtures thereof; and about 0.2 to about 5 parts of a curing agent per 100 parts of said elastomer; and effecting vulcanization.

\* \* \* \* \*